US009656360B2

(12) United States Patent
Multhammer (10) Patent No.: US 9,656,360 B2
(45) Date of Patent: May 23, 2017

(54) GRINDING INSTALLATION AND METHOD FOR REPLACING A GRINDING DISK

(71) Applicant: ASIS GmbH, Landshut (DE)

(72) Inventor: Hans-Juergen Multhammer, Landshut (DE)

(73) Assignee: ASIS GmbH, Landshut (DE)

( * ) Notice: Subject to any disclaimer, the term of this patent is extended or adjusted under 35 U.S.C. 154(b) by 188 days.

(21) Appl. No.: 14/655,759

(22) PCT Filed: Jul. 14, 2014

(86) PCT No.: PCT/EP2014/065019
§ 371 (c)(1),
(2) Date: Jun. 26, 2015

(87) PCT Pub. No.: WO2015/032534
PCT Pub. Date: Mar. 12, 2015

(65) Prior Publication Data
US 2015/0328734 A1    Nov. 19, 2015

(30) Foreign Application Priority Data

Sep. 3, 2013    (EP) .................................... 13182729

(51) Int. Cl.
*B23Q 3/157*    (2006.01)
*B24B 27/00*    (2006.01)
(Continued)

(52) U.S. Cl.
CPC ...... *B23Q 3/15706* (2013.01); *B24B 27/0038* (2013.01); *B24D 9/085* (2013.01);
(Continued)

(58) Field of Classification Search
CPC ............ Y10T 483/10; Y10T 483/1733; Y10T 483/1736; Y10T 483/174; Y10T 483/179;
(Continued)

(56) References Cited

U.S. PATENT DOCUMENTS 3,808,753 A    5/1974   Maran
3,925,878 A *  12/1975  Kikuchi ............... B23Q 3/1554
                                                451/363
(Continued)

FOREIGN PATENT DOCUMENTS

AT              512464 A1     8/2013
DE         202013101858 U1    7/2013
(Continued)

OTHER PUBLICATIONS

EPO Machine Translation of DE202013101858U1—"System for Grinding Surfaces," Jul. 11, 2013.*
(Continued)

*Primary Examiner* — Sunil K Singh
*Assistant Examiner* — Michael Vitale
(74) *Attorney, Agent, or Firm* — LaBatt, LLC (57) ABSTRACT

The invention relates to a grinding installation with a grinding machine having a head plate which is driven in a rotating and/or oscillating manner and is designed for receiving and releasably holding a grinding disk and with a device for replacing a grinding disk, which is releasably fixed on the head plate, with a stop element, against which the head plate with the grinding disk can be placed in a removal position, at least one removal finger which is adjustable between a retracted position and an engaged position, in which the removal finger engages into a recess on the head plate in the removal position, and a clamping means, through which the at least one removal finger is displaceable relative to the stop element, wherein the removal finger, for the purpose of releasing the grinding disk, comes to rest against its rear side and clamps the grinding disk on the stop element. The invention furthermore describes a corresponding method for replacing a grinding disk.

12 Claims, 12 Drawing Sheets

(51) Int. Cl.
 B25J 11/00    (2006.01)
 B24D 9/08    (2006.01)
(52) U.S. Cl.
 CPC .......... B25J 11/0065 (2013.01); *Y10T 483/10* (2015.01); *Y10T 483/174* (2015.01); *Y10T 483/179* (2015.01)
(58) Field of Classification Search
 CPC ............ Y10T 483/1793; B23Q 3/1552; B23Q 3/15706; B24B 27/0038; B24D 9/085
 USPC .............................. 483/1, 30, 31, 33, 54, 55
 See application file for complete search history.

(56) References Cited

U.S. PATENT DOCUMENTS

| | | | | |
|---|---|---|---|---|
| 4,528,743 A | * | 7/1985 | Bleich | ................... B24B 45/003 451/342 |
| 4,604,787 A | * | 8/1986 | Silvers, Jr. | ......... B23Q 3/15526 29/26 A |
| 5,123,216 A | | 6/1992 | Kloss et al. | |
| 5,231,803 A | | 8/1993 | Lanzer | |
| 2001/0041650 A1 | * | 11/2001 | Senga | ..................... B24B 37/20 483/1 |

FOREIGN PATENT DOCUMENTS

| | | | | |
|---|---|---|---|---|
| EP | 2153938 A1 | | 2/2010 | |
| FR | 2942735 A1 | * | 9/2010 | ........... B24B 45/006 |

OTHER PUBLICATIONS

PCT/EP2014/065019, International Search Report with English translation, Aug. 10, 2014, 7 pgs.

Lindner, N.,. PCT/EP2014/065019, English translation of International Preliminary Report on Patentability, Mar. 8, 2016, 7 pgs.

\* cited by examiner

GRINDING INSTALLATION AND METHOD FOR REPLACING A GRINDING DISK

The present invention relates, in accordance with claim 1, to a grinding installation with a grinding machine and a device for replacing a grinding disk which is releasably fixed on a head plate of the grinding machine. In a further aspect the invention relates, in accordance with claim 11, to a method for replacing a grinding disk which is releasably fixed on a head plate of a grinding machine.

Grinding machines are used to process various kinds of materials. A significant field of application is the automotive production.

Grinding disks have a rough surface that is worn out relatively quickly. Hence, grinding disks are consumables that have to be replaced on a regular basis. For this purpose, a grinding disk is usually fastened in a releasable manner on a head plate of the grinding machine.

Replacement of a used grinding disk is in most cases carried out manually. In order to reduce the amount of work involved use is made of specific tools for releasing a grinding disk. A generic grinding installation comprises a grinding machine having a head plate which is driven in a rotating and/or oscillating manner and is designed for receiving and releasably holding a grinding disk, and a device for replacing the grinding disk, which is releasably fixed on the head plate of the grinding machine, which initially uses a stop element, against which the head plate with the grinding disk can be placed in a removal position. In a corresponding generic method for replacing a grinding disk, which is releasably fixed on a head plate of a grinding machine, the head plate with the grinding disk is moved into a removal position, in which the grinding disk abuts a stop element. Subsequently, a grinding disk is conventionally released with a release tool which can also take place in a partially automated manner. Such a device and a generic method are described for example in DE 20 2013 101 858 U1 and AT 512 464 A1. As release tool a doctor blade or a kind of knife is inserted between the head plate and the grinding disk in order to release the contact between these. If this movement is not carried out with a high degree of precision with respect to an exactly positioned head plate, the grinding disk cannot be released.

Another device for replacing a grinding disk which is releasably fixed on a grinding machine is known from U.S. Pat. No. 5,231,803 A.

Grinding machines with a head plate, on which a grinding disk can be held in a releasable manner, are described in U.S. Pat. No. 3,808,753 A, U.S. Pat. No. 5,123,216 A and EP 2 153 938 A1 for example.

A drawback of the known procedure is that the expenditure in terms of human resources is high. Likewise, the time required for this is high. If partially automated solutions are adopted the error frequency increases, with which a grinding disk to be replaced remains undesirably on the head plate.

It is an object of the invention to provide a grinding installation and a method which enable replacement of a grinding disk in a reliable manner and with the minimum degree of manual input.

The object is achieved by the grinding installation with the device for replacing a grinding disk having the features of claim 1 as well as by the method for replacing a grinding disk having the features of claim 11.

Advantageous variants of the method according to the invention and the grinding installation according to the invention are subject matter of the dependent claims and are furthermore set out in the following description, in particular in conjunction with the Figures.

In the grinding installation provision is made according to the invention in that the device for replacing a grinding disk, which is releasably fixed on the head plate of the grinding machine, has: a stop element, against which the head plate with the grinding disk can be placed in a removal position; at least one removal finger which is adjustable between a retracted position and an engaged position, in which the removal finger engages into a recess on the head plate in the removal position, wherein the recess forms an engaging hollow space between the held grinding disk and the head plate; and a clamping means, through which the at least one removal finger is displaceable relative to the stop element. To release the grinding disk the removal finger comes to rest against its rear side and clamps the grinding disk on the stop element.

In the method for replacing a grinding disk, which is releasably fixed on a head plate of a grinding machine, provision is made according to the invention in that in the removal position at least one removal finger is moved from a retracted position into an engaged position, in which it engages into a recess on the head plate and thereby engages behind the grinding disk, wherein the recess forms an engaging hollow space between the held grinding disk and the head plate, in that by way of a clamping means the at least one removal finger is displaced relative to the stop element such that the removal finger comes to rest against the rear side of the grinding disk and clamps the grinding disk on the stop element, and in that the head plate is moved away from the stop element, with the grinding disk being held on the stop element.

A fundamental idea resides in the design of at least one recess in the head plate, into which a removal finger can engage reliably.

If a grinding disk is held, for example, by a hook-and-loop tape on a front face of the head plate a gap between the front face and the grinding disk is extremely small. Such an extremely small gap is used, for example, in DE 20 2013 101 858 U1 in order to introduce a release tool between the grinding disk and the head plate. Due to the small gap even the slightest positional deviations can lead to errors.

By contrast, through the recess an engaging hollow space is created, at which the distance from the head plate to the held grinding disk is larger. Contrary to conventional head plates without recess it is therefore not necessary for an extremely small gap between the head plate and the grinding disk to serve for engagement of a release tool. In fact, due to its relatively large dimensions the recess makes it possible for the removal finger to engage between the head plate and the grinding disk even in the case of positional inaccuracies. Advantageously, no operating personnel are required for this either.

Basically, a removal finger can have any chosen shape as long as its dimensions allow introduction into one of the recesses on the head plate. By preference, the end of the removal finger, with which the removal finger is introduced into the recess, is rounded off. In contrast to a knife-like release tool, as known from DE 20 2013 101 858 U1, it is thus prevented that the removal finger cuts through a grinding disk and is thereby unable to clamp it. For the same reason, the removal finger preferably has no knife edge but is rounded off or has edges of 90° for example.

The at least one recess can advantageously be provided on a lateral surface of the head plate. The head plate can be of approximately cylindrical shape, with the grinding disk being fixed on a front face of preferably circular shape. The at least one recess can then be located on the edge of the lateral surface to the front face.

Another fundamental idea can be seen in the fact that before the actual release of the grinding disk it is initially clamped. This is brought about by a further movement of the at least one removal finger. With a first movement the removal finger is brought from a retracted position, in which it is spaced from the head plate, into an engaged position, in which it engages into the recess. In this position the removal finger is still located at a distance to the grinding disk. This first movement can take place as a radial movement with respect to the approximately cylindrical head plate. Subsequently, in a second movement the removal finger is guided towards the grinding disk. This movement can be considered as an axial movement with respect to the head plate. The clamping of the grinding disk is achieved jointly with the stop element and the clamping means. The clamping means moves the at least one removal finger in the direction of the stop element, whereby the grinding disk is clamped between the removal finger and the stop element.

Afterwards, the head plate can be moved away from the stop element, while the grinding disk to be replaced remains on the stop element.

The stop element preferably has a plane surface, the size of which corresponds at least to that of the grinding disk. In this way, the grinding disk can rest in its entirety against the stop element in the removal position.

The stop element can have several indentations or perforations, whereby an undesired adhesion of the grinding disk on the stop element can be prevented. In addition, an access for sensors is thus provided, with which the replacement process can be monitored. In particular, it can be verified if the grinding disk to be replaced is held on the stop element once the head plate has been moved away.

For an easiest possible release of the grinding disk from the head plate the grinding disk must be held securely on the stop element. To this end, several removal fingers are preferably provided. In this way, the grinding disk is held at several points, whereby the risk of tearing of the grinding disk is reduced too. The removal fingers can be arranged across a section of the circumference of the stop element which can be of plate-shaped design. For example the removal fingers can be arranged in a circle or semi-circle around the stop element.

Uniform movement of the several removal fingers can be accomplished in a cost-efficient manner if all removal fingers are moved by one and the same clamping means. This means that a setting element or another movable element of the clamping means is coupled with each of the removal fingers.

However, for the movement from the retracted position into the engaged position each removal finger can comprise its own setting element.

An electronic control unit can control the clamping of the grinding disk by means of the at least one removal finger. After the head plate has been moved away the control unit can move the removal finger away from the stop element in order to set the grinding disk free.

To move the head plate provision can be made for a grinding robot with a movable arm, on which the grinding machine is arranged.

As soon as the released grinding disk is set free by the removal fingers it falls down. Below the stop element a collecting container can be arranged, in which a released grinding disk is collected.

In order that a removal finger is able to engage into a recess of the head plate a rotational alignment of the head plate must be checked.

The introduction of the removal finger can be facilitated if a recess is wider than the removal finger, by preference at least double as wide. Alternatively or additionally, a recess can narrow radially towards the center of the head plate. Such a V-shape makes it possible for a removal finger to engage even in the case of an imprecise positioning. Furthermore, the removal finger can be held by a joint that allows a movement perpendicular to the direction of movement provided by the clamping means.

However, it is particularly preferred that an alignment unit is provided, with which a rotational alignment of the head plate relative to the at least one removal finger can be determined.

The alignment unit can be arranged such that a rotational alignment of the head plate can be ascertained while the removal position is being assumed. Advantageously, a movement of the head plate from the alignment unit to the removal position, which would otherwise be necessary and may be accompanied by imprecisions as well as an increased time requirement, is thus prevented.

Alternatively, the alignment unit can also be arranged such that during determination of its rotational alignment the head plate is located at a distance to the removal position. In this way, a subsequent upgrading of a device is easier to implement.

By preference, the alignment unit has at least one position sensor, through which a position of the head plate with the grinding disk can be detected and/or brought into a defined set position, i.e. rotational alignment. For instance with the at least one position sensor a hole pattern of the grinding disk can be detected. A control unit can be adapted to rotate the head plate until the at least one position sensor ascertains the desired rotational alignment.

In another preferred embodiment a storage unit with a store of unused grinding disks is provided. In a receiving position an unused grinding disk with an outwardly directed connecting side can be made available from the store. By pressing the head plate onto the connecting side of the unused grinding disk the latter can be connected to the head plate.

The storage unit can comprise holding means which only free the outermost grinding disk each time so that only one grinding disk is always received by the head plate.

Advantageously, the movement of the head plate of the grinding machine can be effected by way of a robot arm, i.e. a movable arm.

In order to prevent operating personnel from being put into danger by movements of the robot arm the grinding installation is constructed in such a way that released grinding disks can be withdrawn from a rear side of the device. The rear side lies outside the movement range of the robot arm which exclusively moves on an opposite front side of the device. For withdrawal of released grinding disks from the rear side the collecting container, which is arranged below the stop element and the removal fingers, can be withdrawn towards the rear side of the device. Likewise, the store can be withdrawn from the rear side to refill unused grinding disks or insert a new store.

To allow for short work sequences with simple constructional means the store and the collecting container are preferably arranged on a common support means. The support means can be drawn or moved out towards the rear side of the device, thus making it possible in one work step to empty the collecting container as well as refill or replace the store.

To improve the safety of the personnel a blocking means can be provided on the support means that carries the store and the collecting container. The blocking means only permits outward movement of the support means on the rear side of the device if the robot arm with the grinding machine is not located on the device. This can be ascertained with a presence sensor on the front side of the device.

To further increase the reliability during replacement of a grinding disk provision can be made on the stop element and/or the storage unit for a respective sensor means, with which the removal or reception of the grinding disk can be verified. The sensor means preferably comprises one or several optical sensors, whereby depending on the kind of interference factors acoustic, capacitive or inductive sensors may also be of advantage.

The grinding installation according to the invention comprises a grinding machine having a head plate which is driven in a rotating and/or oscillating manner and is designed for receiving and releasably holding a grinding disk. The grinding installation furthermore comprises the described device according to the invention for replacing a grinding disk. The grinding installation is designed in conformity with the fundamental idea of the invention, according to which the replacement of a grinding disk is effected by clamping the grinding disk by means of removal fingers. To enable these operations of the removal fingers in a reliable and simple way a special shaping of the head plate of the grinding machine is provided. For instance on an outer edge of the head plate at least one recess is provided which is designed for engaging behind a grinding disk on the head plate and forms an engaging hollow space between the held grinding disk and the head plate. A removal finger can be moved into the recess through a radial movement with respect to the head plate. Advantageously, the removal finger therefore does not have to be introduced at a contact surface of the grinding disk with the head plate between these. This would require a guided movement of extremely high precision which would be detrimental to reliability.

For a most uniform power transmission a radial extension of the head plate is preferably equal to or greater than the radial extension of the grinding disk. Only in the area of a recess is the radial extension of the head plate smaller than that of the grinding disk.

Easy retrofitting of conventional grinding machines is rendered possible if the head plate has an adapter plate, on which the at least one recess is designed. The adapter plate is supported in an exchangeable manner on a base body of the head plate. The base body can also be that part of a grinding machine which is designed for holding a grinding disk so that a conventional grinding machine can be upgraded.

In principle, the grinding disk can be fastened in any chosen way on the adapter plate. By preference, however, a hook-and-loop layer is arranged on the adapter plate for releasably fastening the grinding disk. A hook-and-loop layer is particularly suitable for releasing a used grinding disk according to the invention which is effected through a relative movement between the head plate and the grinding disk.

In a preferred variant of the method the movement of the head plate away from the stop element is effected as a tilting movement. With this movement different contact areas between the head plate and the used grinding disk are released successively. Such a movement is especially useful for releasing a hook-and-loop fastener.

Further advantages and features of the invention are described hereinafter with reference to the accompanying schematic Figures, wherein shows.

In the Figures identical components and those having the same effect are as a general rule denoted with the same reference signs.

With reference to FIGS. 1 to 4 an embodiment of a grinding installation 110 according to the invention is described. The grinding installation 110 comprises a grinding machine 10 with a head plate 15, on which a grinding disk is held, as well as a device 100 according to the invention for replacing the grinding disk. FIGS. 1 to 4 illustrate successive method steps, by which the grinding disk is replaced.

The device 100 for replacing a grinding disk comprises as essential components an alignment unit 20, a clamping means 30 for moving removal fingers 31 and a storage unit 60. The grinding machine 10 has a head plate 15, on which the grinding disk to be replaced is arranged. The head plate 15 of the grinding machine 10 can be fastened via an active contact flange 11 on a robot arm (not shown). To replace the grinding disk the grinding machine 10 with the head plate 15 is initially moved to the alignment unit 20, then further on to the clamping means 30 with the removal fingers 31 and finally to the storage unit 60.

Figure 1:
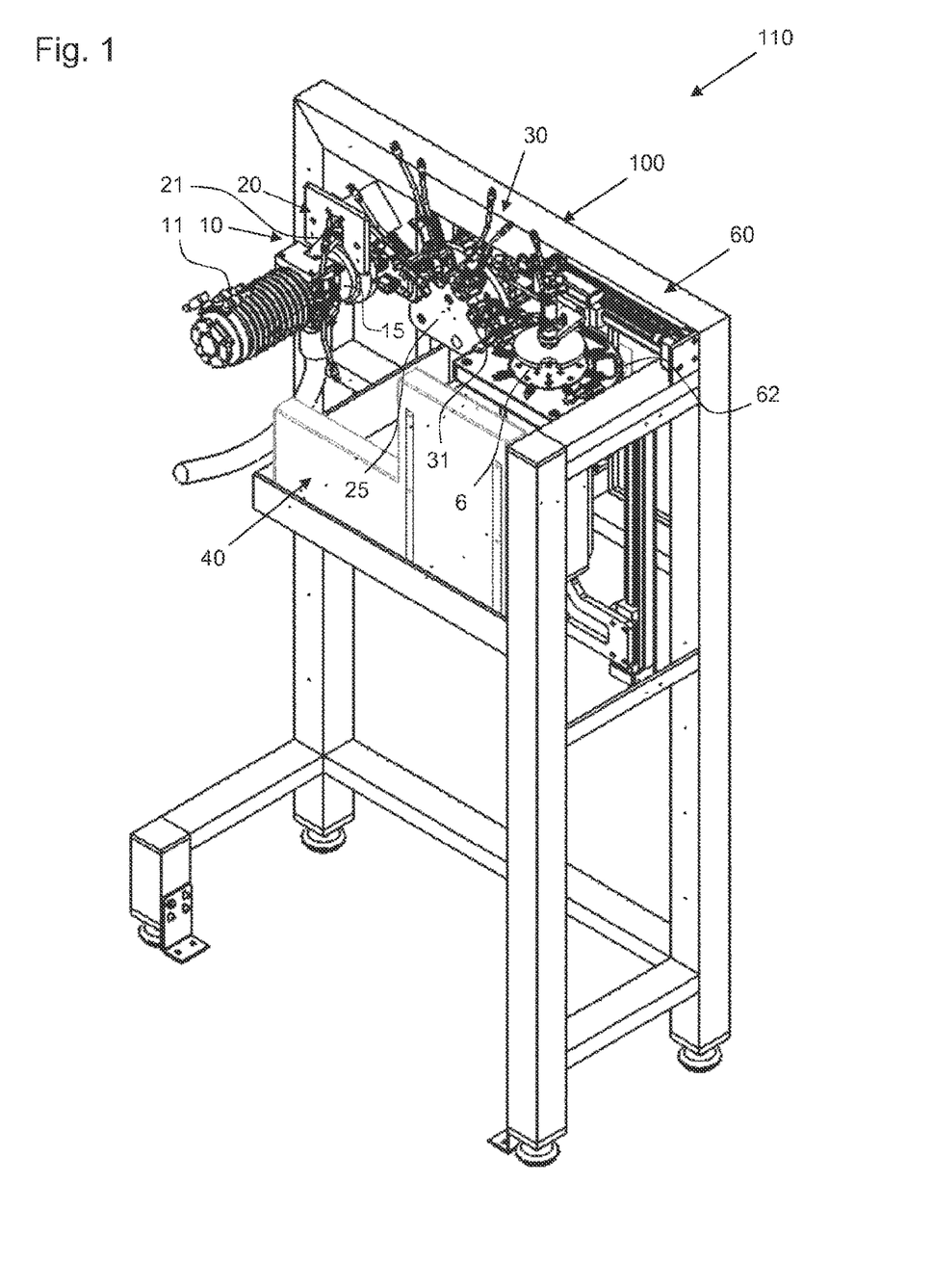
FIG. 1 a perspective view of a grinding installation according to the invention with a grinding machine and a device for replacing a grinding disk of the grinding machine.

In the situation of FIG. 1 the head plate 15 of the grinding machine 10 is moved to an alignment position, in which the alignment unit 20 is able to measure a rotational alignment of the head plate. This situation is shown in enlarged view in FIG. 5.

Figure 5:
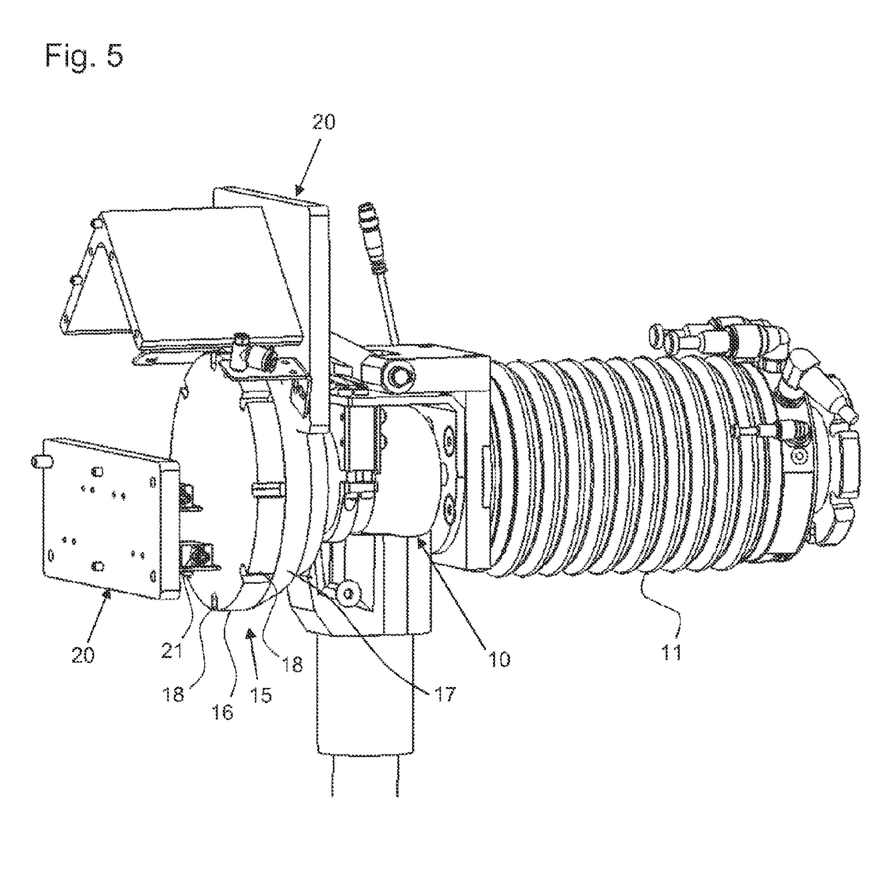
FIG. 5 a perspective view of a grinding machine of a grinding installation according to the invention as well as components of a device according to the invention for replacing a grinding disk.

As shown in FIG. 5, at least one recess 18 is formed in the head plate 15. In the illustrated example several recesses 18 are provided that are distributed across the circumference, i.e. the lateral surface of the head plate 15. On the head plate 15 a grinding disk (not shown) can be held. The grinding disk comprises several holes. By means of the alignment unit 20 the position of this hole pattern of the grinding disk is ascertained relative to a longitudinal axis of the contact flange 11 or the robot arm. For this purpose the alignment unit 20 comprises several position sensors 21. The alignment unit 20 can have a stop or a centering corner, through which the head plate 15 can be brought into a defined position with respect to the alignment unit 20. In this defined position the rotational alignment of the head plate 15 is at first unknown. In order to determine this, the location of the holes of the grinding disk is determined by the position sensors 21. If the position sensors 21 are designed such that they are able to measure through the material of the grinding disk, the recesses 18 can also be used for position determination. In this case at least one measuring range of one of the position sensors 21 can be directed to an external area of the head plate 15. Depending on the rotational position a recess 18 or the material of the head plate 15 is located in this external area. Reliability of the alignment unit 20 can be enhanced if the measuring range of a further position sensor 21 is directed to a central area of the head plate 15 where there can be no recess 18. By offsetting the measured signals of the two aforementioned position sensors 21 the rotational alignment of the head plate 15 can be detected with a high degree of certainty.

In the example of FIG. 5 the head plate 15 has an adapter plate 16, on which the recesses 18 are formed. On the front face or front side of the adapter plate 16 the grinding disk is fastened (not shown in FIG. 5). On a rear side, i.e. opposite to the front side, the adapter plate 16 comprises fastening means. With these it can be mounted in a torque-proof manner on a base body 17 of the head plate 15. As a result, conventional grinding machines 10, in which the head plate 15 only has a base body 17 but no adapter plate 16 with recesses 18, can be retrofitted easily. In such conventional grinding machines 10 a grinding disk is fastened directly on a plane surface of the base body 17. For retrofitting, the rear side of the adapter plate 16 is connected to this plane surface of the base body 17.

Figure 2:
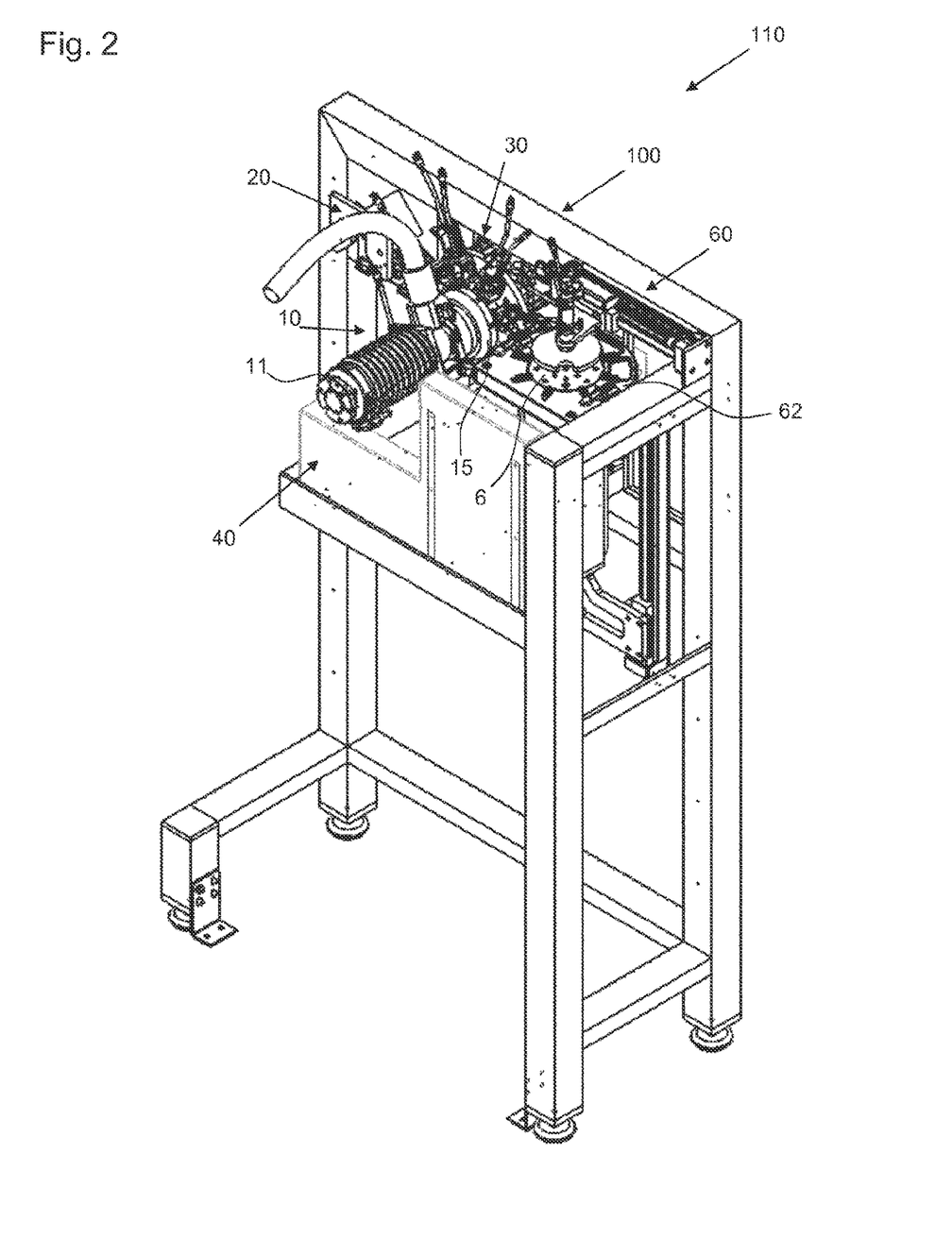
FIG. 2 a perspective view of the grinding installation of FIG. 1, wherein a robot arm with the grinding machine has been moved on as compared to the situation of FIG. 1.

As soon as the rotational position has been determined by the alignment unit 20 and set to a desired value the robot arm along with the head plate 15 is moved from the situation shown in FIG. 1 to the situation depicted in FIG. 2. This situation is shown in enlarged view in FIG. 7.

Figure 7:
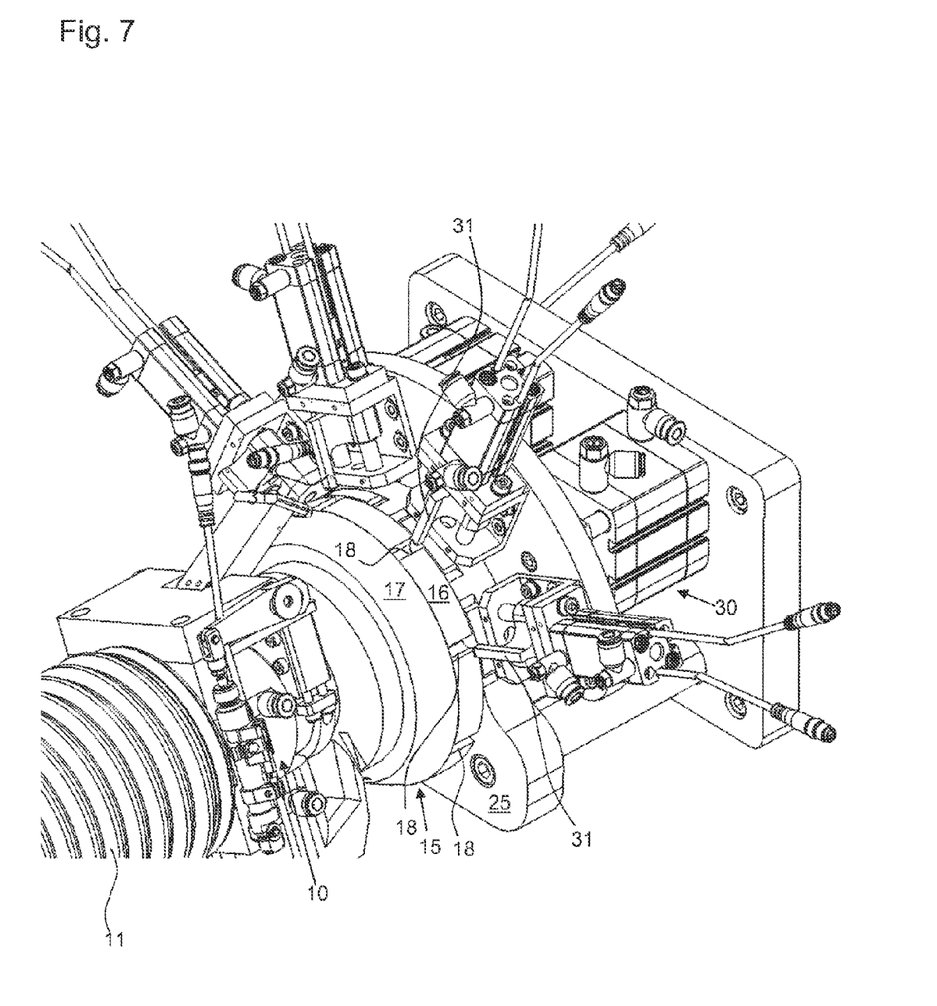
FIG. 7 a perspective view of components of a grinding installation according to the invention, wherein the removal fingers have not yet moved into recesses of a head plate of the grinding machine.

The head plate 15 is moved against a stationary stop element 25 of the device 100. In this way, the head plate 15 is located in a defined removal position. The rotational alignment of the head plate 15 is known from the previous measurement with the alignment unit 20. The grinding disk to be replaced is located between the head plate 15 and the stop element 25.

The stop element 25 has a plane stop surface which is preferably at least of the same size as the surface of the grinding disk to be replaced.

Adjacent to the stop element 25 the removal fingers 31 are arranged. During movement of the head plate 15 towards the stop element 25 the removal fingers 31 are located in a retracted position. As soon as the head plate 15 with the grinding disk 5 is in the removal position, the removal fingers 31 are moved from the retracted position towards the center of the head plate 15. In this way, the removal fingers are guided into an engaged position, in which they engage into the recesses 18.

The removal fingers 31 can have an elongate shape. From the retracted position to the engaged position they can be moved in the direction of their longitudinal axis. By preference, each removal finger 31 has on its lateral surface a plane contact surface. In the engaged position the plane contact surface is directed towards the grinding disk. As a result of the plane contact surface a particularly large contact area can be reached between a removal finger 31 and the abutting grinding disk.

The rotational alignment of the head plate 15 is chosen such that the removal fingers 31 can engage into the recesses 18 when they are adjusted in the direction of their longitudinal axes.

Figure 8:
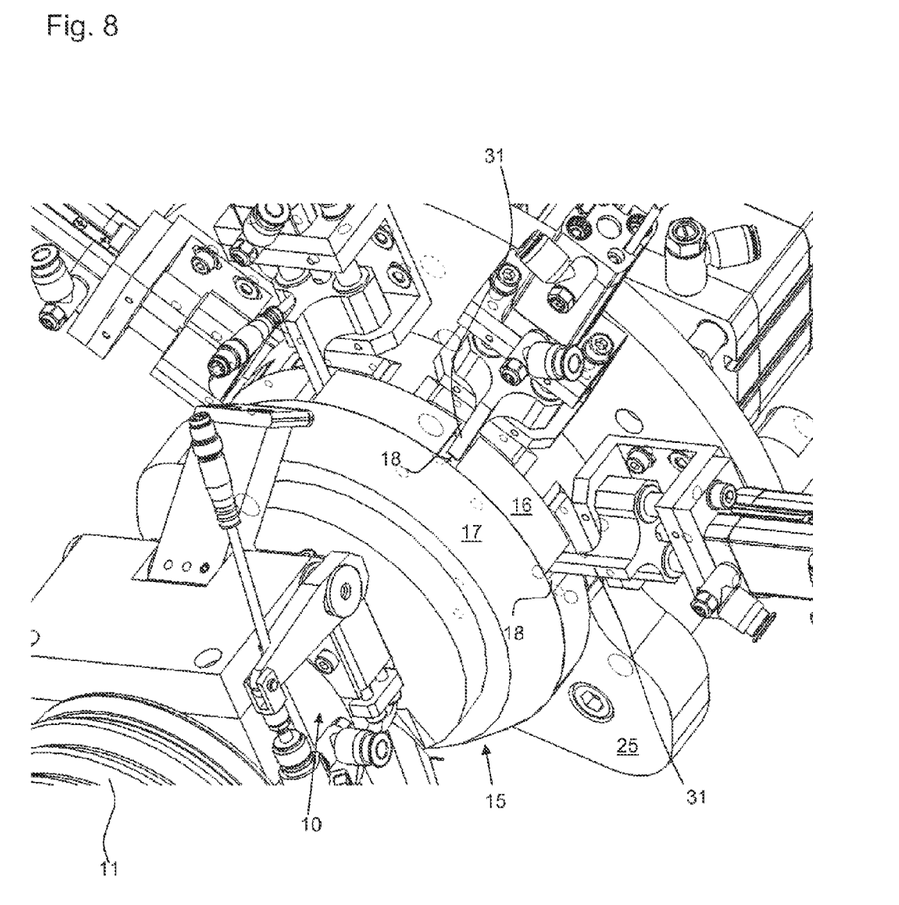
FIG. 8 a perspective view of the components of FIG. 7, wherein the removal fingers have moved into the recesses of the head plate whilst not yet making contact with a grinding disk held on the head plate.

In the following the functionality of the removal fingers 31 is described in greater detail with reference to FIGS. 7 to 10. In the situation of FIG. 7 the removal fingers 31 are located in the retracted position. In this position they clear the required space, across which the head plate 15 is moved with the grinding disk against the stop element 25. Subsequently, the removal fingers 31 are moved inwards into the engaged position which is depicted in FIG. 8.

Both in the circumferential direction of the head plate 15 and in an axial direction of the head plate 15 and the elongate contact flange 11 the size of each recess 18 is larger than the engaging removal finger 31. This makes it possible for a removal finger 31 to engage into a recess 18 even in the case of slight positional inaccuracies of the head plate 15. In this engaged position the removal finger 31 does not yet make contact with the grinding disk. In FIG. 8 this can be recognized by the fact that a free space still remains between the removal fingers 31 and the stop element 25.

Figure 9:
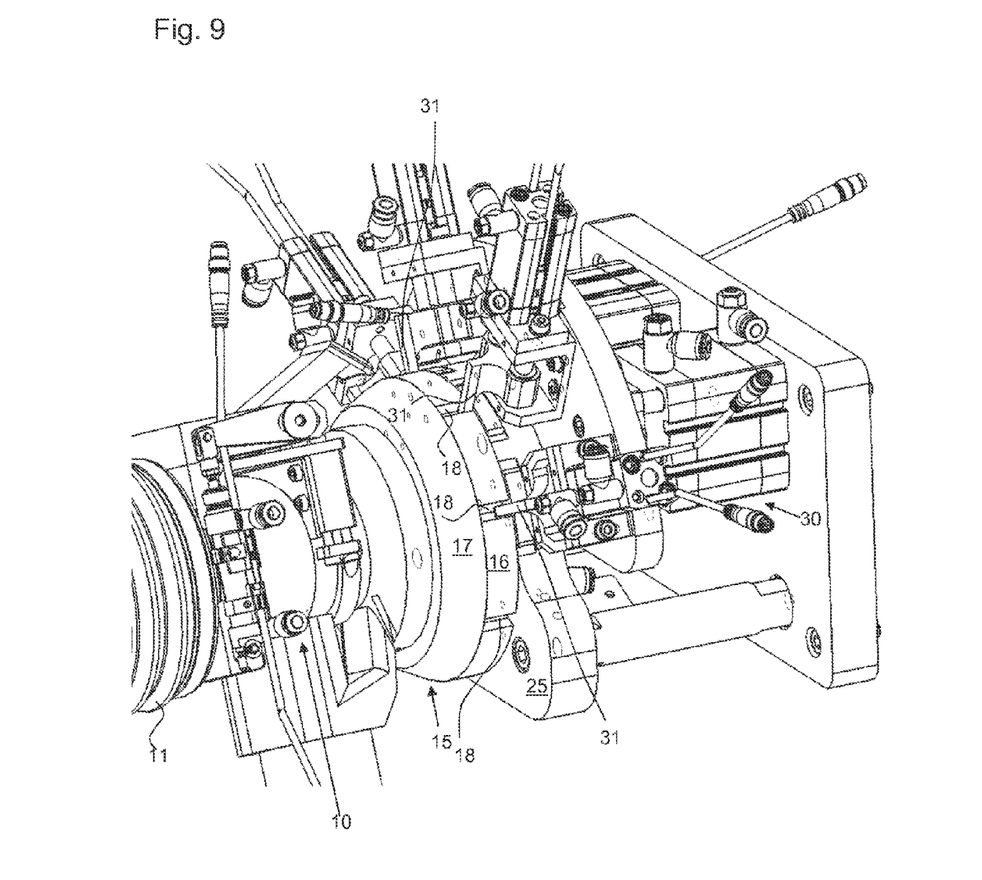
FIG. 9 a perspective view of the components of FIGS. 7 and 8, wherein the removal fingers have moved into the recesses of the head plate and clamp the grinding disk against a stop element.

Subsequently, the removal fingers 31 are moved by the clamping means 30 against the stop element 25. This is illustrated in FIG. 9. In this situation the grinding disk to be released is held or clamped between the removal fingers 31 and the stop element 25.

Figure 10:
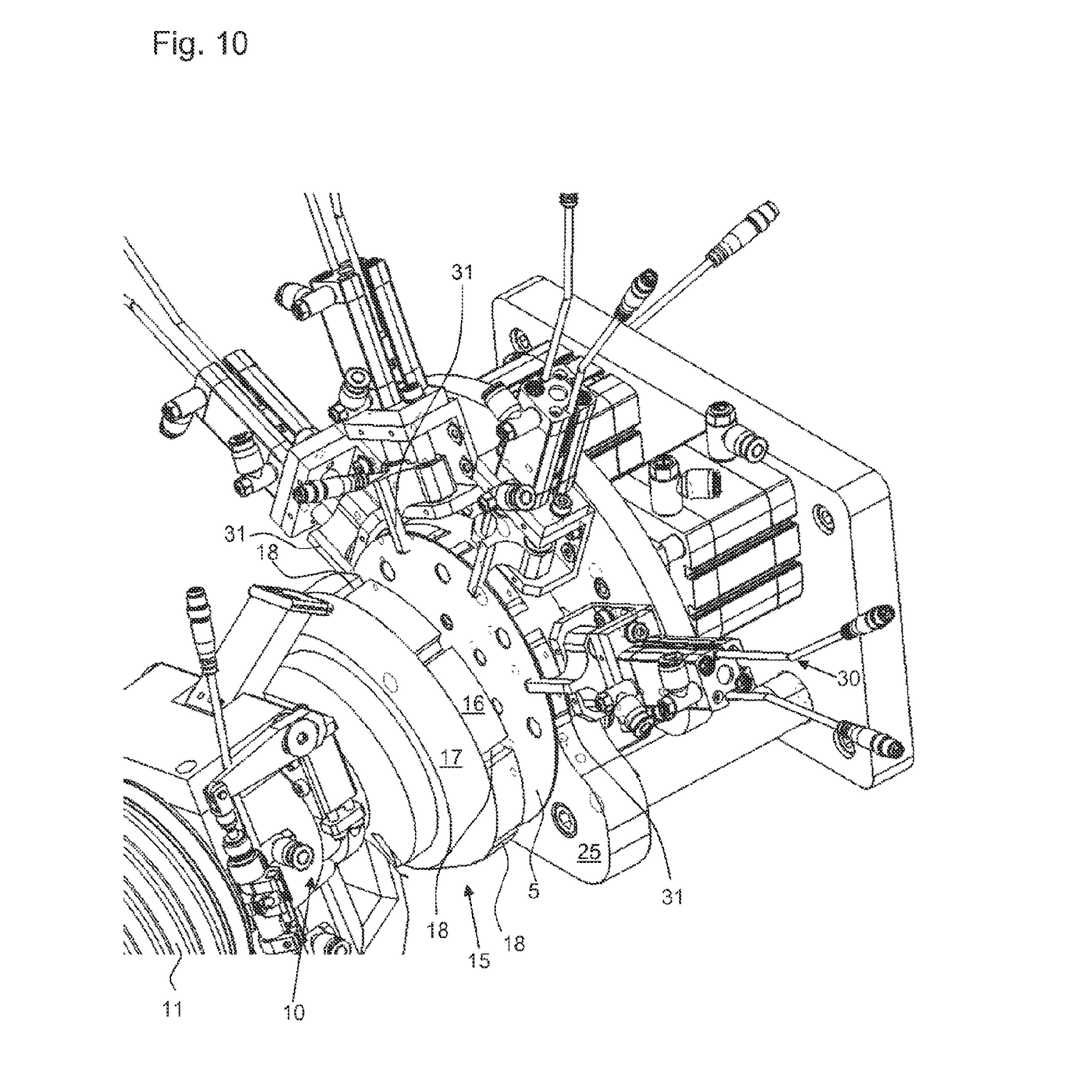
FIG. 10 a perspective view of the components of FIGS. 7 to 9, wherein the head plate is moved away from the clamped grinding disk.

If the head plate 15 is then moved away from the stop element 25, the grinding disk remains on the stop element 25. This step is shown in FIG. 10. In particular, the grinding disk 5 can be seen. It can comprise several holes that are of advantage for the grinding process. For the release of the grinding disk 5 with the removal fingers 31 these holes are not necessary. As indicated in FIG. 10, the movement of the head plate 15 is effected through a tilting movement. In this way, different contact areas between the head plate 15 and the grinding disk 5 are released successively rather than simultaneously. For an easy release this is especially advantageous if hook-and-loop tapes are used for holding the grinding disk 5 on the head plate 15.

Figure 3:
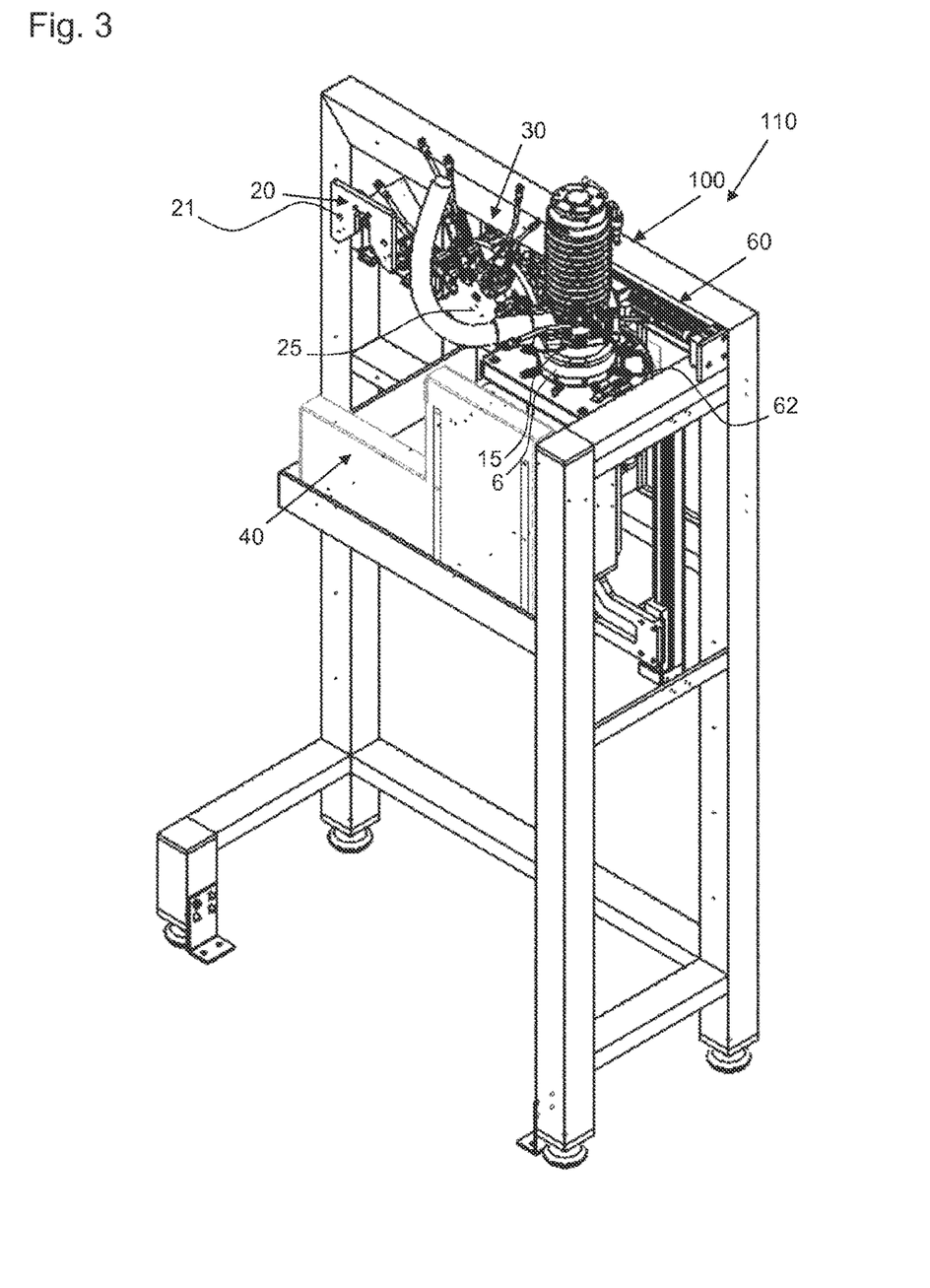
FIG. 3 a perspective view of the grinding installation of FIGS. 1 and 2, wherein the robot arm with the grinding machine has been moved on as compared to the situation of FIG. 2.

Once the used grinding disk 5 has been released from the head plate 15 the grinding machine 10 with the head plate 15 is moved further on to the storage unit 60, as illustrated in FIG. 3. An enlarged illustration of the storage unit 60 is provided in FIG. 11. The storage unit 60 comprises a store 62 with a plurality of unused grinding disks 6. By way of holding means only one unused grinding disk 6 can be taken each time from the store 62. In this process, the grinding disk 6 faces with a connecting side out of the store 62 so that this connecting side can be connected easily to the head plate 15 by pressing the head plate 15 onto it. With this step the replacement of a used grinding disk 5 by an unused grinding disk 6 is completed.

Figure 11:
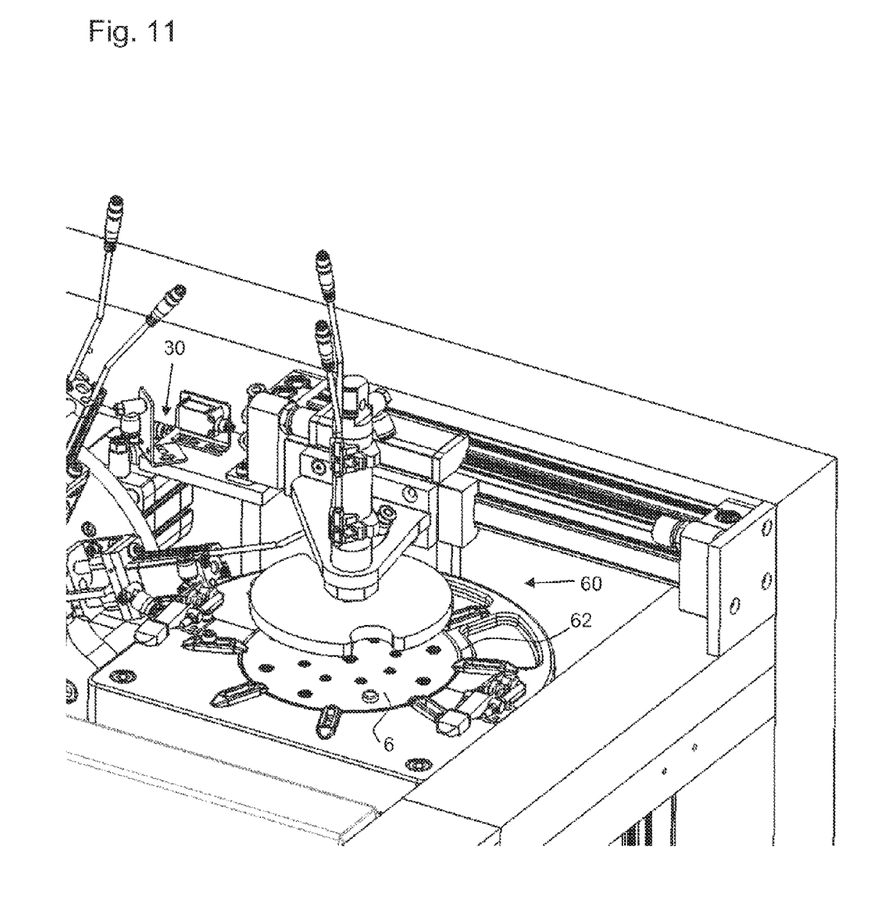
FIG. 11 a perspective view of components of a grinding installation according to the invention, wherein the robot arm with the head plate is located in front of a store with unused grinding disks, and FIG. 12 a perspective view of a storage unit which is open for refilling unused grinding disks.

To verify whether an unused grinding disk 6 has been received from the store 62 and is held by the head plate 15, one or several sensors are preferably located on the storage unit 60. By preference, the sensors can use the recesses 18 for this verification. If it is ascertained that the recesses 18 are covered, the presence of a grinding disk 6 on the head plate 15 can be inferred therefrom.

Figure 6:
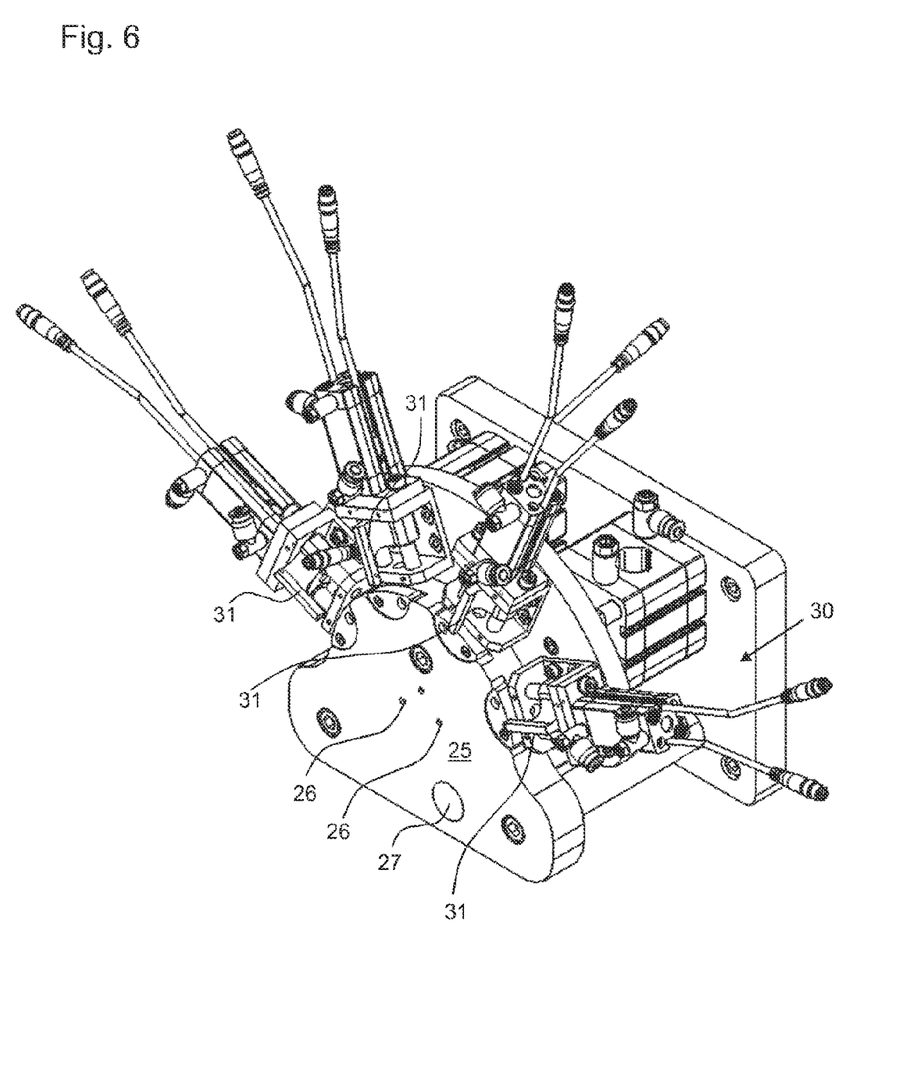
FIG. 6 a perspective view of components of the grinding installation of FIGS. 1 to 5.

In order for the device 100 to be ready for a further replacement, the removal fingers 31 are moved back to the retracted position. With this, the grinding disk 5, having been clamped up to then, is set free and falls into a collecting container 40 arranged below the stop element 25, see for instance FIGS. 1 to 3. To release a grinding disk 5 in a particularly reliable manner from the stop element 25, the said stop element 25 can comprise blow-off openings 26, as depicted in FIG. 6. By way of ventilation means air can be blown through the blow-off openings 26 against a grinding disk which undesirably adheres to the stop element 25.

By preference, it is verified whether a grinding disk 5 remains on the stop element 25 after the head plate 15 has moved away from the stop element 25. As depicted in FIG. 6, the stop element 25 can have a sensor opening 27 for this purpose. Through this a sensor can measure if a grinding disk 5 abuts thereon. The sensor can be a light sensor for example. By means of the sensor it can also be verified whether a grinding disk 5 released from the head plate 15 falls into the collecting container 45.

Figure 4:
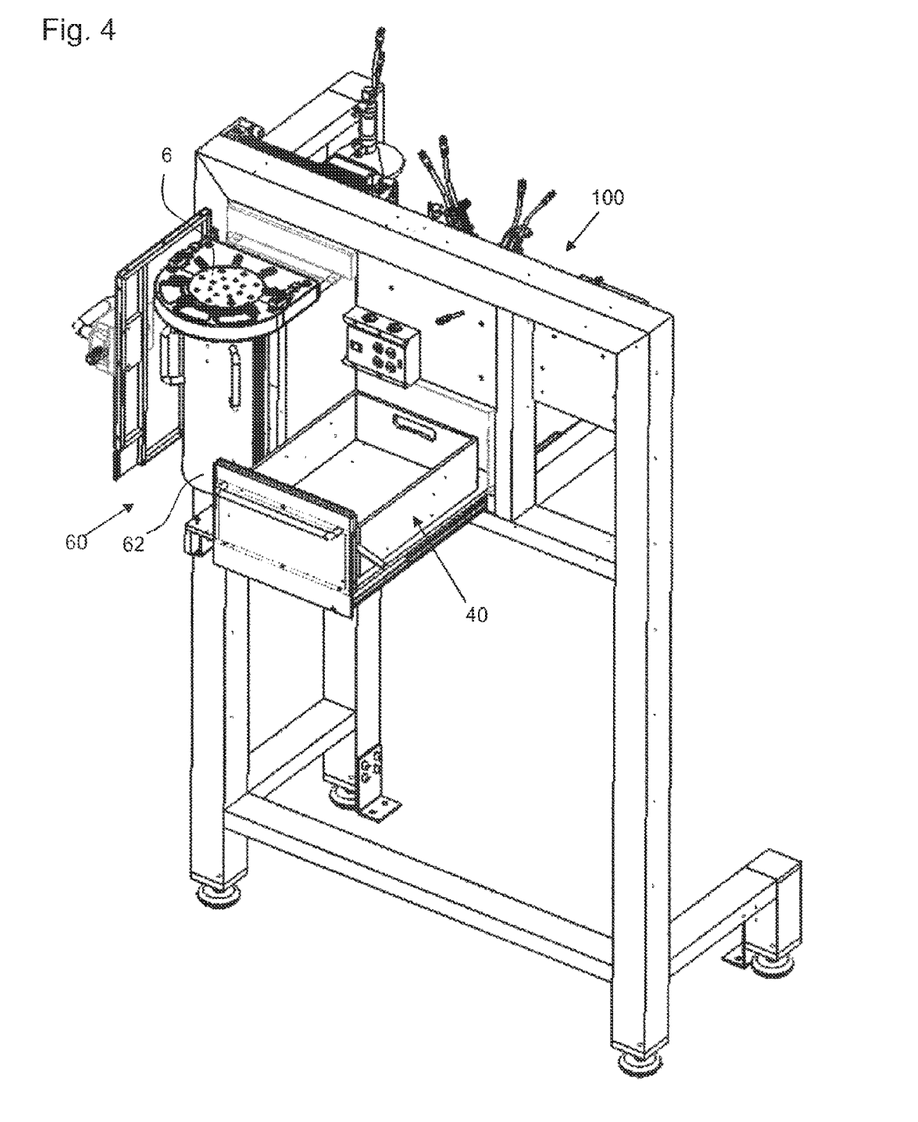
FIG. 4 a perspective view of the rear side of the grinding installation of the preceding Figures.

Emptying of the collecting container 40 is effected from a rear side of the device 100, which is shown in FIG. 4. For instance a retainer or another type of support means for holding the collecting containers 40 can be moved out on the rear side. Likewise, the store 62 can also be moved out on the rear side. This situation is shown in FIG. 4. Advantageously, the space required for emptying the collecting container 40 and for refilling the store 62 is separate from the movement space of the robot arm for replacing a grinding disk.

Figure 12:
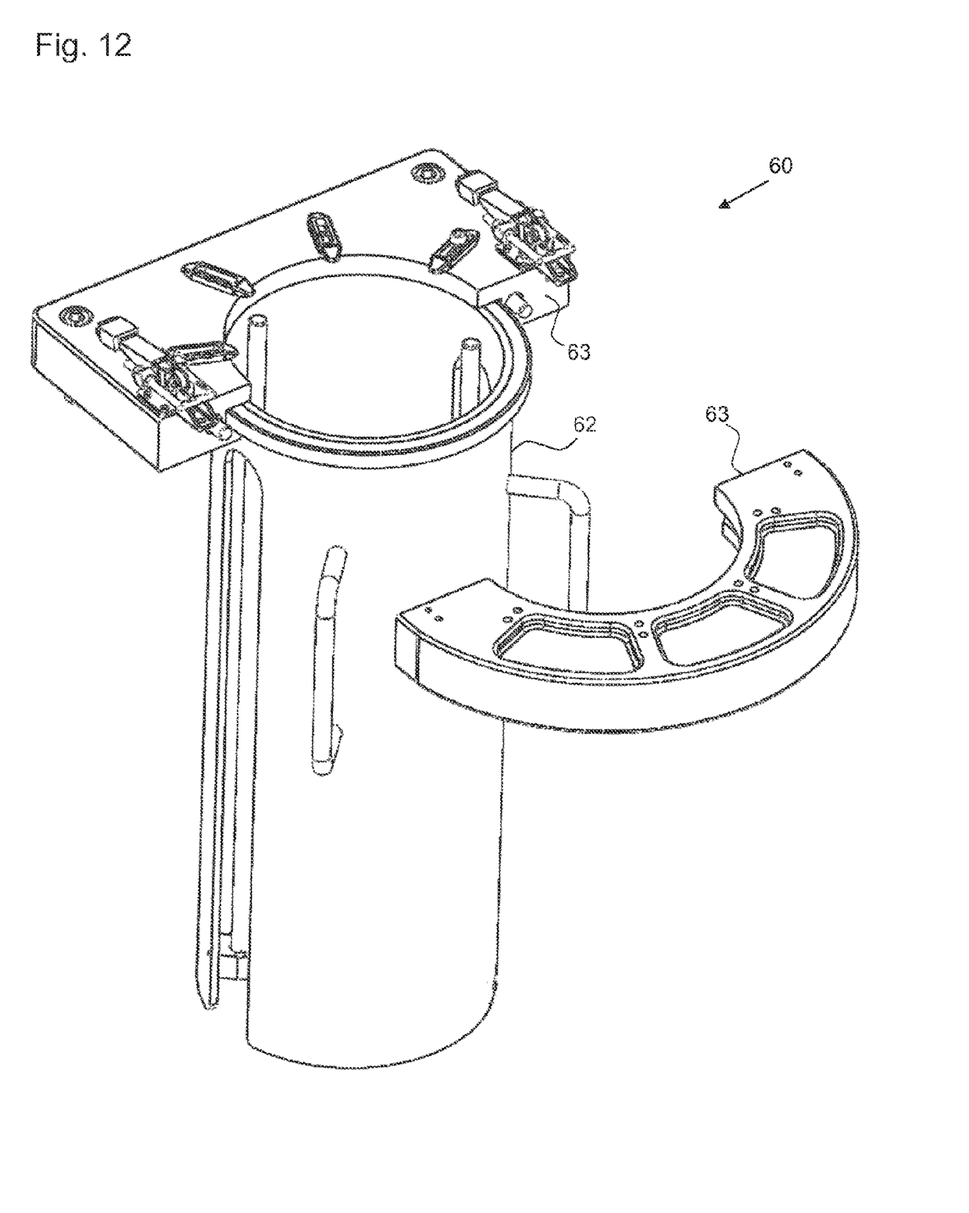

As shown in FIG. 12, for refilling or replacing an empty store 62 a multi-part cover 63 of the store 62 can be moved apart and taken off.

As a result of the invention a reliable replacement of grinding disks is rendered possible on a grinding machine with relatively simple means. The time and personnel required for this is advantageously low.

The invention claimed is:

1. A grinding installation apparatus, comprising:
a grinding machine having a head plate which is driven in at least one of: a rotating manner or an oscillating manner, and is designed for receiving and releasably holding a grinding disk, and
a device for replacing the grinding disk, wherein the device has a stop element, against which the head plate with the grinding disk can be placed in a removal position, wherein
on an outer edge of the head plate at least one recess is provided, which for the purpose of engaging behind the grinding disk, forms an engaging hollow space between the grinding disk and the head plate, and
the device has at least one removal finger which is adjustable between a retracted position and an engaged position, in which the at least one removal finger engages into one of the at least one recess on the head plate in the removal position, and
the device has a clamping means, through which the at least one removal finger is displaceable relative to the stop element, wherein the at least one removal finger, for the purpose of releasing the grinding disk, comes to rest against a rear side of the grinding disk and clamps the grinding disk on the stop element.

2. The grinding installation apparatus as defined in claim 1, wherein
the at least one removal finger comprises a plurality of removal fingers that are distributed at least across a section of a circumference of the stop element.

3. The grinding installation apparatus as defined in claim 1, wherein
below the stop element a collecting container is arranged for collecting the released grinding disk.

4. The grinding installation apparatus as defined in claim 1, wherein
the device has an alignment unit, which is configured to determine a rotational alignment of the head plate relative to the at least one removal finger.

5. The grinding installation apparatus as defined in claim 4, wherein
the alignment unit has at least one position sensor, which is configured to at least one of: detect a position of the head plate with the grinding disk, or bring the position of the head plate with the grinding disk into a defined set position.

6. The grinding installation apparatus as defined in claim 1, wherein
the device has a storage unit with a store of unused grinding disks, and
in a receiving position an unused grinding disk having an outwardly directed connecting side is made available from the store, and the connecting side of the unused grinding disk is configured to connect to the head plate when pressing the head plate onto the connecting side of the unused grinding disk.

7. The grinding installation apparatus as defined in claim 1, wherein
a sensor means is provided on at least one of: the stop element or the storage unit, and the sensor means is configured to verify the removal or reception of the grinding disk.

8. The grinding installation apparatus as defined in claim 1, wherein
a grinding robot with a movable arm is provided, and the grinding machine is arranged on the moveable arm.

9. The grinding installation apparatus as defined in claim 1, wherein
the head plate has an adapter plate on which the at least one recess is formed, and
the adapter plate is supported in an exchangeable manner on a base body of the head plate.

10. The grinding installation apparatus as defined in claim 9, wherein
on the adapter plate a hook-and-loop layer is arranged for releasably fastening the grinding disk.

11. A method for replacing a grinding disk which is releasably fixed on a head plate of a grinding machine, the method comprising:
moving the head plate with the grinding disk into a removal position, in which the grinding disk abuts a stop element, wherein
in the removal position at least one removal finger is moved from a retracted position into an engaged position, in which the at least one removal finger engages into a recess on the head plate and thereby engages behind the grinding disk, wherein the recess forms an engaging hollow space between the grinding disk and the head plate, and by way of a clamping means the at least one removal finger is displaced relative to the stop element such that the at least one removal finger comes to rest against a rear side of the grinding disk and clamps the grinding disk on the stop element, and the head plate is moved away from the stop element, with the grinding disk being held on the stop element.

12. The method as defined in claim 11, wherein the movement of the head plate away from the stop element is effected as a tilting movement, through which different contact areas between the head plate and the grinding disk are released successively.

* * * * *